Patented Aug. 11, 1942

2,292,672

UNITED STATES PATENT OFFICE 2,292,672

LUBRICANT

Reuben A. Swenson, Hammond, Ind., assignor to Standard Oil Company, Chicago, Ill., a corporation of Indiana No Drawing. Application June 29, 1940, Serial No. 343,268

5 Claims. (Cl. 252—37)

This invention relates to a composition of matter, and more particularly to a lubricant. Because of its physical and chemical properties the composition is especially adapted for the lubrication of such machinery as roll necks in rolling mills and is known as a semi-fluid neck grease.

Heretofore lubrication of such machinery has been inefficient and generally unsatisfactory because lubricants of proper consistency when at the bearing temperature are extremely viscous when cold. For a particular lubrication service, a lubricant of definite viscosity is required to stand the operating load and conditions. Hence a lubricating material of high viscosity is required on account of the high temperature conditions and shock loading. Moreover, lubricants which have otherwise satisfactory properties frequently do not have sufficient resistance to water or can not be applied readily at normal temperatures.

One object of my invention is to provide a lubricant which is semi-fluid at normal temperatures but which possesses sufficient viscosity to withstand severe operating conditions of high temperatures and shock loading. Another object is to provide a lubricating compound of generally improved quality. A still further object is to provide lubricants having increased resistance to heat and water and increased adhesion to metal, adapting them for use under severe conditions, and which may be applied at moderate temperatures.

I have found that these and other objects may be attained by combining petroleum oil, blown asphalt and a soap formed by reacting a heavy metal oxide and a fatty oil such as fats, fatty acids, or mixtures thereof. The preferred heavy metal oxide is litharge and preferred fatty oils are unsaturated oils such as fish oils, for example, menhaden oil. Other fatty oils of fish origin such as hydrogenated fish oil fatty acid also may be reacted with the heavy metal oxide.

The reaction between a neutral fat and litharge is an addition reaction without the elimination of either water or aldehydes, and without the formation of glycerine. The material thus produced is known in the trade as a lead soap. Conventional lead fish oil soap is made by reacting litharge with fish oil, the quantity of litharge being such that the bivalent lead will satisfy the fatty acid content of the fish oil. The product is made by heating the fish oil to about 300° F. and adding the litharge thereto slowly. The fish oil soap used in this invention is a different lead fish oil soap and is prepared by using twice as much litharge as with regular lead fish oil soap. I refer to this lead fish oil soap as high lead soap and it is prepared from more than about 0.6 pound litharge or its equivalent per pound of oil. For example, in preparing regular lead fish oil soap, 0.378 pound of litharge per pound of menhaden oil is used. In making the high lead soap, 0.8 pound of litharge per pound of menhaden oil may be used.

The semi-fluid neck grease of this invention comprises blown asphalt and petroleum oil in addition to the high lead soap and the composition may be varied to meet changes in operating conditions. About 2% to about 20% and preferably from about 4% to about 12% high lead fish oil soap is satisfactory. No naturally occurring asphalt is included since substantially asphalt-free oils are blended with a blown asphalt and the high lead fish oil soap. The high lead fish oil soap prepared by this method goes into solution in the oils used in the semi-fluid neck grease and therefore will not settle out on standing. The quantity of blown asphalt used may be from about 25% to about 55%.

No. 1 Korite is a suitable blown asphalt which is prepared by air-blowing a 75° M. P. Mid-Continent residuum up to a softening point of from about 175° F. to about 185° F. The specifications of No. 1 Korite are:

| | |
|---|---|
| Softening point | 175–185° F. |
| Penetration | 32° F.—not less than 18 decimillimeters |
| Penetration | 77° F.—30 to 40 decimillimeters |
| Penetration | 115° F.—not more than 70 decimillimeters |
| Solubility in $CS_2$ and $CCl_4$ | 99+% |

The high lead fish oil soap and blown asphalt are blended with a selected oil or oils in such a manner as to give the required viscosity of product. Examples of oils suitable for blending are the two oils having the following specifications:

| | Low cold test stock | Bright stock |
|---|---|---|
| Flash | 315° F | 520° F. |
| Pour | −25° F | +45° F. |
| Viscosity at 100° F | 80–85 sec. Saybolt | |
| Viscosity at 210° F | | 175–185 sec. Saybolt. |
| Color | 2–2.5 N. P. A | Green. |

My new product can be prepared in the following manner, although it is not necessary to adhere strictly to that procedure. About 1% of the low viscosity oil called for by the formula is charged to a mixer adapted to be heated. All of the litharge is added and stirred into the oil until a smooth paste results. The menhaden oil and an equal amount of the low viscosity oil are then added while stirring. The contents of the mixer are then heated at 300° to 325° F. for two to three hours until the reaction is complete. The balance of the petroleum oil and the blown asphalt, preferably preblended with some of the petroleum oil, are then added, and stirred to uniformity at a temperature of 200° to 250° F. The batch is then finished and may be filled at temperatures within this range or lower.

In another procedure the high lead fish oil soap can be prepared separately and added to a substantial portion of the petroleum oil in a mixer adapted to be heated. The mixture then is heated to about 200–250° F. and the blown asphalt, preblended with the balance of the petroleum oil, is added. When the batch has been stirred to uniformity it may be filled.

As illustrative of preferred compositions the following examples are included. It will be understood, however, that these examples are intended only as illustrating my invention and not as limiting its scope.

|  | I | II | III | IV |
|---|---|---|---|---|
|  | Percent | Percent | Percent | Percent |
| Menhaden oil | 4.49 | 4.49 | 4.49 | 2.63 |
| Litharge | 3.51 | 3.51 | 3.51 | 3.37 |
| No. 1 Korite (blown asphalt) | 30 | 40 | 51 | 40 |
| 300 flash low cold test stock | 26 | 30 | 41 | 30 |
| No. 3 bright stock | 36 | 22 |  | 24 |

The product of Example I has a Saybolt Universal viscosity at 210° F. of 220 to 245 seconds and is a light grade suitable for use during the winter months. The product of Example II is a medium grade having a Saybolt Universal viscosity at 210° F. of 300 to 325 seconds. This material is adapted for use in late fall and early spring. The composition of Example III with a Saybolt Universal viscosity at 210° F. of 425 to 450 seconds is a heavy grade for summer use. The variations in the composition of each of the above formulae ordinarily will not exceed about ±5% in the blown asphalt content with a corresponding adjustment in the petroleum oil content.

Lead soaps which can be used in the manufacture of semi-fluid neck greases include high lead fish oil soap and lead soap of hydrogenated fish oil fatty acids, for example, Hydrofol. An example of a semi-fluid neck grease containing a lead fatty acid soap is as follows:

V

| | Parts by weight |
|---|---|
| Litharge | 1.17 |
| Hydrgenated fish oil fatty acid | 2.94 |
| Blown asphalt | 40 |
| Petroleum oil, viscosity at 210° F.—175–210 sec. Saybolt | 25 |
| Petroleum oil, viscosity at 100° F.—70–150 sec. Saybolt | 31 |

The manufacture of such a semi-fluid neck grease is similar to the preparation of the grease containing high lead fish oil soap except for the control temperatures. The litharge can be added to a small amount of the petroleum oil and stirred into a smooth paste. Then the fatty acid is added along with an equal amount of petroleum oil. The mixture is heated at a temperature of from about 200 to 220° F. during the elimination of the water of reaction. After most of the water has been removed, the temperature is raised to 275–300° F. and maintained at this point until the reaction is complete. The balance of the petroleum oil and all the blown asphalt are added and stirred in thoroughly. Finished neck greases of this type dehydrated at temperatures from 220° to 350° F. are not as water-resistance as those containing a small amount of water. Therefore, when the temperature of the batch has cooled to about 210°–220° F., a small amount, for example, 0.5 to 1% water can be added. This product is stirred down to 100°–120° F. before it is filled out because if a semi-fluid neck grease containing high lead fatty acid soap is filled hot, it gels to a solid grease on cooling. A higher filling temperature can be used with the fatty oil soaps.

The temperature and times of reaction and compounding given above have been found to give satisfactory products, but these can be varied so long as they are adequate to bring about the formation of my new product.

Additional desirable characteristics can be obtained by adding high molecular weight synthetic polymers such as high molecular weight isoolefin or monoolefin polymers before filling. Fillers such as asbestos, talc or graphite, may also be added before filling.

It is apparent that many widely different embodiments of this invention may be made without departing from the spirit and scope thereof, and therefore it is not intended to be limited except as indicated in the appended claims.

I claim:

1. A semi-fluid neck grease comprising petroleum oil between about 25% and about 55% blown asphalt, and between about 2% and about 20% of high lead soap comprising the reaction product of litharge and a fatty oil of fish origin.

2. A semi-fluid neck grease comprising petroleum oil, from about 2% to about 20% high-lead fish oil soap, and from about 25 to about 55% brown asphalt.

3. A semi-fluid neck grease having a Saybolt Universal viscosity at 210° Fahrenheit of from 220 to about 450 seconds, comprising petroleum oil, about 8% high-lead fish oil soap, and from about 30% to about 50% blown asphalt having a softening point of from about 175° to 185° F.

4. A water-resistant semi-fluid neck grease having a Saybolt Universal viscosity at 210° F. of between about 220 and about 450 seconds, comprising substantially asphalt-free petroleum oil, between about 4% and about 12% of a high lead soap comprising the reaction product of lead oxide and a fatty oil of fish origin, and between about 25% and 55% blown asphalt.

5. A water-resistant semifluid neck grease having a Saybolt Universal viscosity at 210° F. of between about 220 and about 450 seconds, comprising substantially asphalt free petroleum oil between about 4% and about 12% of a high lead soap comprising the reaction product of lead oxide and a fatty oil of fish origin, between about 25% and 55% blown asphalt having a softening point of between about 175° F. and about 185° F., and between about 0.5% and about 1.0% water.

REUBEN A. SWENSON.

CERTIFICATE OF CORRECTION.

Patent No. 2,292,672. August 11, 1942.

REUBEN A. SWENSON.

It is hereby certified that error appears in the printed specification of the above numbered patent requiring correction as follows: Page 2, second column, line 47, claim 2, for the word "brown" read --blown--; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.